(12) United States Patent  (10) Patent No.: US 8,115,356 B2
Bauer  (45) Date of Patent: Feb. 14, 2012

(54) FLUID DYNAMIC BEARING SYSTEM

(75) Inventor: Martin Bauer, Villingen-Schwenningen (DE)

(73) Assignee: Minebea Co., Ltd., Nagano-ken (JP)

( * ) Notice: Subject to any disclaimer, the term of this patent is extended or adjusted under 35 U.S.C. 154(b) by 285 days.

(21) Appl. No.: 12/454,657

(22) Filed: May 21, 2009

(65) Prior Publication Data

US 2010/0052446 A1    Mar. 4, 2010

(30) Foreign Application Priority Data

May 28, 2008  (DE) .......................... 10 2008 025 618

(51) Int. Cl.
*H02K 5/16* (2006.01)
(52) U.S. Cl. .......................................... 310/90; 384/110
(58) Field of Classification Search .................... 310/90, 310/67 R; 384/100, 107, 110
See application file for complete search history.

(56) References Cited

U.S. PATENT DOCUMENTS

| 3,249,390 A | * | 5/1966 | Schwartzman | ............... 384/110 |
| RE36,202 E | * | 4/1999 | Hajec | ............. 310/90 |
| 6,148,501 A | | 11/2000 | Grantz | |
| 7,063,463 B2 | | 6/2006 | Gomyo | |
| 7,564,154 B2 | * | 7/2009 | Reuter | ............ 310/90 |
| 2003/0107281 A1 | | 6/2003 | Obara | |
| 2003/0138174 A1 | | 7/2003 | Leuthold | |

FOREIGN PATENT DOCUMENTS

WO    9828550    7/1998

* cited by examiner

*Primary Examiner* — Dang Le
(74) *Attorney, Agent, or Firm* — Cooper & Dunham LLP

(57) ABSTRACT

The invention relates to a fluid dynamic bearing system having a first conical bearing and a second conical bearing working in opposition to the first conical bearing, the conical bearings being disposed along a stationary shaft. The first conical bearing has a first bearing cone disposed on the shaft having bearing surfaces extending at an angle α to the rotational axis, and a first bearing bush having a tapered bearing bore and bearing surfaces that are separated by a first bearing gap filled with bearing fluid from the bearing surfaces of the first bearing cone. The second conical bearing has a second bearing cone disposed on the shaft having bearing surfaces extending at an angle β to the rotational axis, and a second bearing bush having a tapered bearing bore and bearing surfaces that are separated by a second bearing gap filled with bearing fluid from the bearing surfaces of the second bearing cone. According to the invention, the bearing surfaces of the first conical bearing are smaller in surface area than the bearing surfaces of the second conical bearing and the angle α is greater than the angle β.

11 Claims, 2 Drawing Sheets

FLUID DYNAMIC BEARING SYSTEM

BACKGROUND OF THE INVENTION

The invention relates to a fluid dynamic bearing system as may be used, for example, in spindle motors for driving hard disk drives.

OUTLINE OF THE PRIOR ART

Fluid dynamic bearings are the main type of bearing to find application as rotary bearings in spindle motors as used, for example, for driving the storage disks in hard disk drives. A fluid dynamic bearing is a development on a sliding bearing that is formed by a bearing sleeve having, for example, a cylindrical bore and a shaft set into the bore. The shaft or the inner surface of the bore has appropriate bearing surfaces that are provided with a grooved pattern, the diameter of the shaft being slightly smaller than the diameter of the bore. A concentric bearing gap filled with a bearing fluid thus remains between the two bearing surfaces. The bearing surfaces of the shaft and the bearing bush form a radial bearing, fluid dynamic pressure being generated in the bearing fluid by the grooved patterns when the shaft rotates in the bearing bush. The bearing arrangement is stabilized along the rotational axis by a fluid dynamic axial bearing or thrust bearing. The axial bearing is formed in a well-known manner by bearing surfaces aligned perpendicular to the rotational axis, using a thrust plate, for example, disposed on the shaft, the thrust plate interacting with a counter bearing.

Other fluid dynamic bearing designs are also known, such as conical bearings in which the shaft has a tapered section that comes to lie in an associated tapered bearing bore, thus producing bearing surfaces extending obliquely to the rotational axis that exert both a radial as well as an axial bearing force on the shaft. This kind of conical fluid dynamic bearing is known, for example, from U.S. Pat. No. 7,063,463 B2 or in a double conical form, for example, from WO98/28550 A1. The two conical bearing regions are made symmetric. The described bearing has a stationary shaft. Since the bearing or the bearing gap is open at both ends of the bearing, the shaft can be fixed at both ends, which goes to improve the stiffness of the bearing over a shaft that is fixed only at one end. If the bearing is used, for example, for the rotatable support of a spindle motor, one end of the shaft is generally fixedly accommodated in a baseplate, whereas the other end is fixed to the cover plate of the motor. As a rule, the baseplate consists of a solid metal part having high stiffness, whereas the cover plate is made of a less stiff plastic or sheet metal part that is fixed to the baseplate. Another weak point is the side walls of the baseplate that not only have less stiffness but are also subject to shearing forces when the motor is in operation. If the various stiffnesses of the fluid bearings and their mounts are not perfectly matched to each other, this can result in vibrations and wobbling of the shaft. Should the spindle motor be used for driving a hard disk drive, the wobble could impair the read/write operation of the hard disk drive.

SUMMARY OF THE INVENTION

It is the object of the invention to provide a fluid dynamic bearing system having a conical bearing that has improved stiffness over the known conical bearings.

This object has been achieved by a bearing system according to the characteristics of independent claim 1.

Preferred embodiments of the bearing system and further advantageous characteristics are cited in the subordinate claims.

The fluid dynamic bearing system according to the invention comprises a first conical bearing and a second conical bearing working in opposition to the first conical bearing, the conical bearings being disposed along a stationary shaft. The first conical bearing has a first bearing cone disposed on the shaft having bearing surfaces extending at an angle $\alpha$ to the rotational axis, as well as a first bearing bush having a tapered bearing bore and bearing surfaces that are separated from the bearing surfaces of the first bearing cone by a first bearing gap filled with a liquid bearing fluid. The second conical bearing has a second bearing cone disposed on the shaft having bearing surfaces extending at an angle $\beta$ to the rotational axis, as well as a second bearing bush having a tapered bearing bore and bearing surfaces that are separated from the bearing surfaces of the second bearing cone by a bearing gap filled with a liquid bearing fluid. According to the invention, the bearing surfaces of the first conical bearing have a smaller surface area than the bearing surfaces of the second conical bearing.

The use of two conical bearings working in opposition to one another produces a bearing system that has high bearing stiffness at a low overall height. According to the invention, the bearing surfaces of the two conical bearings are given different dimensions and thus adjusted in their stiffness to the stiffness of the adjoining components receiving the shaft. The bearing surfaces and thus the stiffness of the lower, second conical bearing is chosen to be greater than the bearing surfaces and the stiffness of the upper, first conical bearing because the end of the shaft adjoining the lower bearing is fixed in a comparatively stiff baseplate, whereas the end of the shaft adjoining the upper bearing is fixed to a less stiff motor housing.

Due to the different sizes of the bearing surfaces, the axially directed bearing force of the two bearings working in opposition to one another are also of different magnitude, thus leading to an imbalance in an axial direction. In order to compensate this axial imbalance, provision is according to the invention for the angle $\alpha$ of the bearing surfaces of the first, upper bearing to be greater than the angle $\beta$ of the bearing surfaces of the second, lower bearing, so that, despite the smaller bearing surface, the upper bearing gene rates an axial force of equal magnitude to the lower bearing.

In a preferred embodiment of the invention the effective bearing surfaces $A_{L1}$ of the upper first bearing and the effective bearing surface $A_{L2}$ of the lower, second bearing, as well as the lengths $L_1$ of the respective portions of the bearing gap of the upper bearing and $L_2$ of the lower bearing are chosen to fulfil the following equation:

$$L_1 \cdot A_{L1} \cdot \sin \alpha = L_2 \cdot A_{L2} \cdot \sin \beta$$

Thus, it is made sure that the upper first bearing generates an axial force of equal magnitude to the lower second bearing, in spite of its smaller total surface. The effective bearing surfaces $A_{L1}$ and $A_{L2}$ are usually smaller than the total surface of the respective bearing cone. This is mainly because only parts of the total surface of the bearing cones comprise bearing grooves and that the bearing gap slightly varies in width and thereby additionally influences the total bearing force.

The angles $\alpha$ and $\beta$ are preferably chosen within the interval of 25° to 45°.

According to the invention, the two bearing bushes are connected to each other and form the rotatable part of the bearing system.

The invention relates to a bearing system open at both ends having two separated conical bearings having independent bearing gaps. Each bearing gap thus has two open ends that are sealed from the environment by capillary sealing gaps and dynamic pumping patterns.

An open end of each bearing gap is sealed by a capillary sealing gap that is defined by a surface of the associated bearing cone and an adjoining surface of a cover cap connected to the associated bearing bush. The sealing gap is preferably disposed at an angle with respect to the rotational axis and is set substantially perpendicular on the bearing gap. The sealing gap is partially filled with bearing fluid and is disposed such that it opens radially inwards. This goes to ensure that, on rotation of the bearing, the centrifugal forces acting in the sealing gap on the bearing fluid force the bearing fluid inwards in the direction of the bearing gap. In addition to the capillary action of the sealing gap, this prevents bearing fluid from leaking out of the sealing gap. The cover cap also provides some protection against any leakage of bearing fluid.

The fluid dynamic bearing may preferably be employed for the rotatable support of a spindle motor as used, for example, for driving hard disk drives.

DESCRIPTION OF A PREFERRED EMBODIMENT OF THE INVENTION

Figure 1:
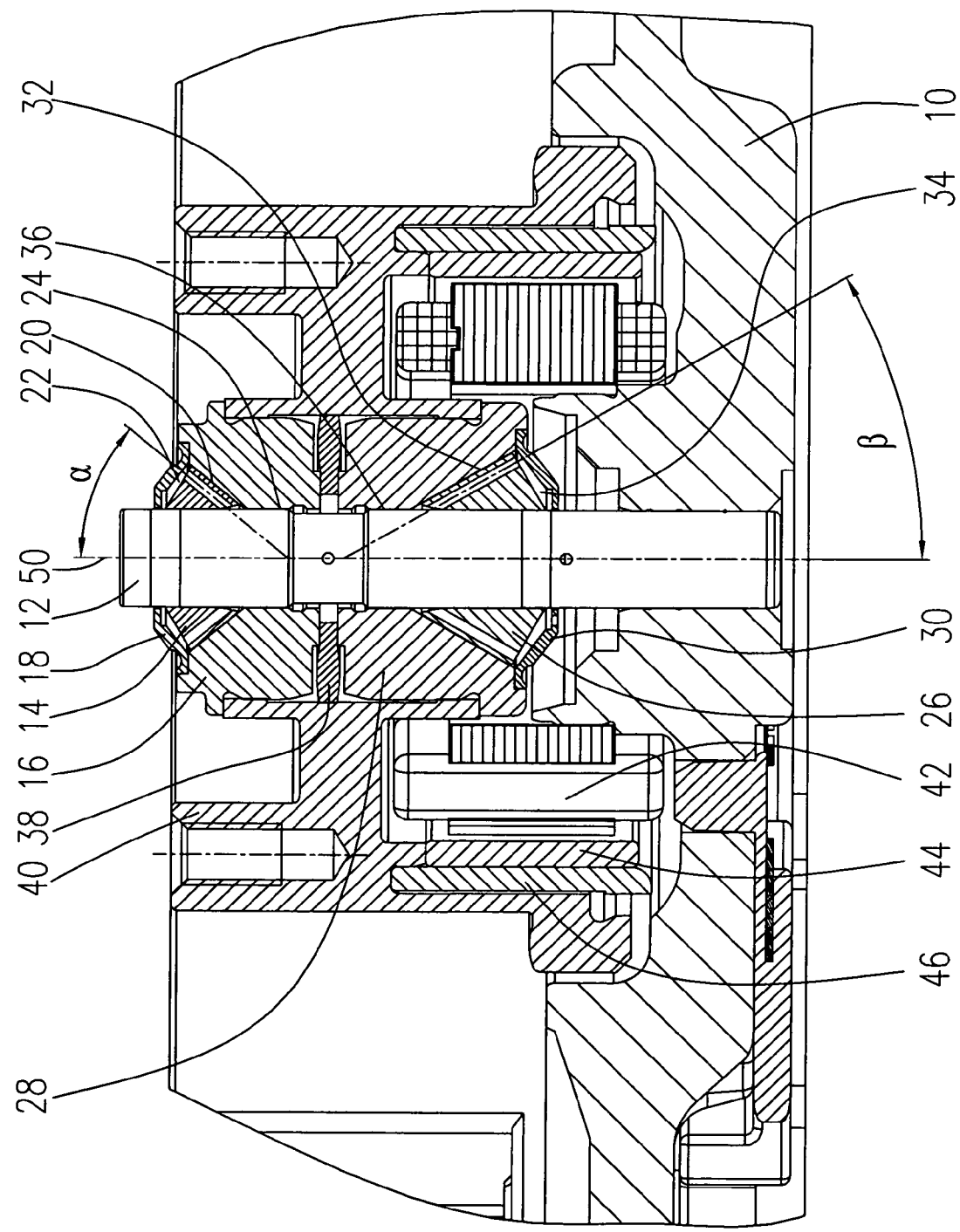
FIG. 1 shows a section through a spindle motor having a bearing system according to the invention.
Figure 2:
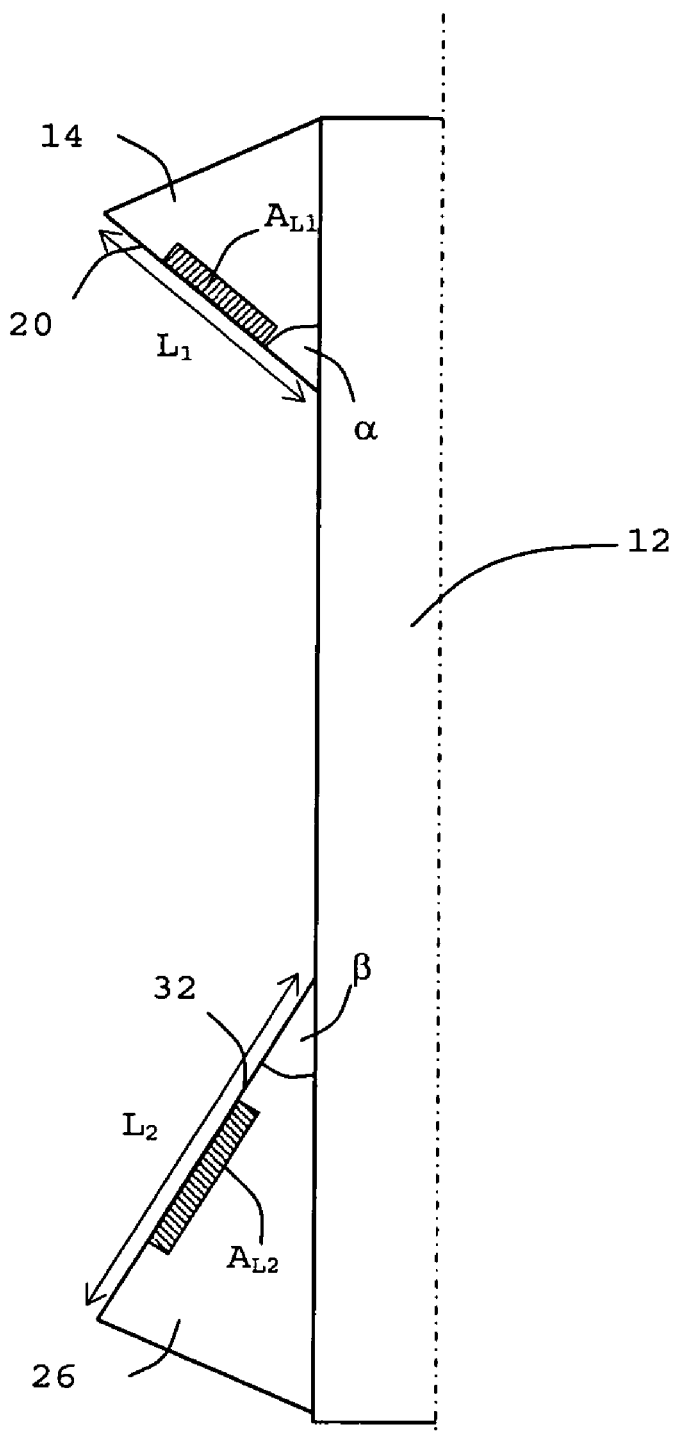
FIG. 2 schematically shows the geometry of a bearing system according to a preferred embodiment of the invention.

The invention is now described in more detail based on an embodiment with reference to FIGS. 1 and 2.

FIG. 1 shows a section through a spindle motor having a bearing system according to the invention.

The spindle motor comprises a baseplate 10 as the supporting structure in which a stationary shaft 12 is disposed such that it projects for the most part beyond the surface of the baseplate. Together with two bearing cones 14, 26, the shaft 12 forms the stationary part of the bearing system. The bearing cones 14, 26 are disposed at a distance to one another on the shaft 12 and fixedly connected to the shaft 12. The bearing cones 14, 26 have bearing surfaces facing each other and extending at an angle to the rotational axis 50. Associated with the first bearing cone 14 is a bearing bush 16 that has a partly tapered bearing bore and bearing surfaces which are separated from the bearing surfaces of the first bearing cone 14 by a first bearing gap 20 filled with bearing fluid. The bearing surfaces and the bearing gap 20 thus extend obliquely to the rotational axis 50. The bearing gap 20 has two open ends, each adjoining the end faces of the bearing bush 16. The first open end of the bearing gap 20 is sealed by a capillary sealing gap 22 that is defined by a surface of the first bearing cone 14 and an adjoining surface of a cover cap 18 connected to the first bearing bush 16. The sealing gap 22 is set approximately at right angles to the bearing gap 20 and forms an acute angle to the rotational axis 50. The sealing gap 22 is partially filled with bearing fluid and acts simultaneously as a fluid reservoir. The lower end of the bearing gap 20 is sealed by another sealing gap 24 that takes the form of a pumping seal in that pumping patterns are formed either on the shaft 12 or on the bearing bush 16 in the region of the gap 24.

The second bearing cone 26 has bearing surfaces that form an acute angle to the rotational axis 50. The bearing cone 26 is disposed in a second bearing bush 28 that also has tapered bearing surfaces which are separated from the bearing surfaces of the second bearing cone 26 by a second bearing gap 32. The second bearing gap is also sealed at both its open ends by a sealing gap 34 and a pumping seal 36 respectively. The sealing gap 34 is defined by appropriate surfaces of the second bearing cone 28 and a cover cap 30 disposed on the second bearing bush 28. The sealing gap 34 extends approximately at right angles to the bearing gap 32 and at an angle to the rotational axis 50. The second open end of the bearing gap 32 is sealed by the pumping seal 36. The two bearing bushes 16 and 28 adjoin each other and are separated from one another by a distance plate 38 that is simultaneously used for temperature compensation as well as acting as a sealing ring. The space between the outside circumference of the shaft and the bearing bushes or the distance plate 38 is ventilated for purposes of pressure equalization. To this end, the shaft 12 may have an appropriate bore that connects the space to the outside atmosphere.

According to the invention, the bearing surfaces of the upper conical bearing, consisting of bearing cone 14 and bearing bush 16, is made considerably smaller than the bearing surfaces of the lower conical bearing, consisting of bearing cone 26 and bearing bush 28. The lower conical bearing thus generates a greater bearing force, which is warranted by the stiffer attachment of the end of the shaft adjoining this conical bearing. The upper end of the shaft 12 is generally connected to a housing (not illustrated) that has less stiffness than the baseplate 10. The upper bearing is thus made less stiff than the lower conical bearing. To nevertheless achieve the same axial bearing force in both bearings, which is important for keeping the bearing system in equilibrium, the bearing surfaces of the upper bearing are aligned at a greater angle α with respect to the rotational axis 50 than the bearing surfaces of the lower bearing. This means that despite its smaller bearing surface, the upper bearing demonstrates the same axial bearing force as the lower bearing, so that the bearing system remains in equilibrium and the bearing gaps 20, 32 of the two bearings are approximately the same width.

The two bearing bushes 14 and 28 are held in a central recess of a hub 40 of the spindle motor, taking the form, for example, of an interference fit. Both bearing bushes 16 and 28 have a collar that rests on an end face of the rim of the opening in the hub 40. The bearing bushes 16, 28 are preferably made of steel, ceramics or suchlike, i.e. a material having a low temperature expansion coefficient, whereas the hub 40 is made, for example, of aluminum, i.e. a material having a high temperature expansion coefficient. The bearing cones 14, 26 are disposed with respect to the bearing bushes 16, 28 such that at room temperature the bearing gaps 20, 32 have a defined width of a few micrometers. Among other factors, the load-carrying capacity of the conical bearings depends on the width of the bearing gaps 20, 32 and the viscosity of the bearing fluid held therein. If the ambient temperature rises, the viscosity of the bearing fluid generally decreases, thus also resulting in a decrease in the load-carrying capacity of the bearings, at an otherwise constant bearing gap width. In order to compensate this effect, the bearing bushes 16, 28 are supported in the hub such that the relatively strong thermal expansion of the hub 40 is transferred in an axial direction to the bearing bushes 16, 28, as a result of which they are forced apart and the width of the bearing gaps 20, 32 is reduced. Thus, with a rise in temperature, the decreasing viscosity of the bearing fluid is compensated by a reduction in the width of the bearing gaps 20, 32.

The spindle motor is driven by an electromagnetic drive system that consists of a stator arrangement 42 fixed to the baseplate 10 and a rotor magnet 44 lying opposite the stator arrangement and fixed to the hub 40, the rotor magnet being enclosed by a yoke 46.

FIG. 2 schematically shows the geometry of a bearing system according to a preferred embodiment of the invention. $A_{L1}$ describes the effective bearing surface of the upper first bearing cone 14. $L_1$ describes the length of the respective portion bearing gap 20. $A_{L2}$ describes the effective bearing surface of the lower second bearing cone 26. $L_2$ describes the length of the respective portion of the bearing gap 32. In order to achieve axial forces of equal magnitude, the parameters $A_{L1}$, $A_{L2}$, $L_1$, $L_2$, $\alpha$ and $\beta$ fulfill the equation $$L_1 \cdot A_{L1} \cdot \sin \alpha = L_2 \cdot A_{L2} \cdot \sin \beta.$$

IDENTIFICATION REFERENCE LIST

10 Baseplate
12 Shaft
14 First bearing cone
16 First bearing bush
18 Cover cap
20 First bearing gap
22 Sealing gap
24 Pumping seal
26 Second bearing cone
28 Second bearing bush
30 Cover cap
32 Second bearing gap
34 Sealing gap
36 Pumping seal
38 Distance plate
40 Hub
42 Stator arrangement
44 Rotor magnet
46 Yoke
50 Rotational axis
$A_{L1}$ first effective bearing surface
$A_{L2}$ second effective bearing surface
$L_1$ length of first bearing gap
$L_2$ length of second bearing gap
$\alpha$ first cone-angle
$\beta$ second cone-angle

The invention claimed is:

1. A fluid dynamic bearing system having a first conical bearing and a second conical bearing working in opposition to the first conical bearing, the conical bearings being disposed along a stationary shaft (12), and the first conical bearing having a first bearing cone (14) disposed on the shaft (12) having bearing surfaces extending at an angle $\alpha$ to the rotational axis (50), and a first bearing bush (16) having a tapered bearing bore and bearing surfaces that are separated by a first bearing gap filled with liquid bearing fluid (20) from the bearing surfaces of the first bearing cone (14), and the second conical bearing having a second bearing cone (26) disposed on the shaft (12) having bearing surfaces extending at an angle $\beta$ to the rotational axis (50), and a second bearing bush (28) having a tapered bearing bore and bearing surfaces that are separated by a second bearing gap (32) filled with liquid bearing fluid from the bearing surfaces of the second bearing cone (26), wherein the bearing surfaces of the first conical bearing are smaller in surface area than the bearing surfaces of the second conical bearing and that angle $\alpha$ is greater than angle $\beta$, and further characterized in that an end of the stationary shaft adjoining the second conical bearing is fixed in a baseplate.

2. A fluid dynamic bearing system according to claim 1, characterized in that the equation $L_1 \cdot A_{L1} \cdot \sin \alpha = L_2 \cdot A_{L2} \cdot \sin \beta$ is valid, where $A_{L1}$ is the effective bearing surface of the first bearing cone (14), $A_{L2}$ is the effective bearing surface of the second bearing cone (26), $L_1$ is the length of the first bearing gap (20) and $L_2$ is the length of the second bearing gap (32).

3. A fluid dynamic bearing system according to claim 1, characterized in that the two bearing bushes (16; 28) are connected to each other and form the rotatable part of the bearing system.

4. A fluid dynamic bearing system according to claim 1, characterized in that each bearing gap (20; 32) has two open ends that are sealed by capillary sealing gaps (22, 34) and pumping seals (24, 36).

5. A fluid dynamic bearing system according to claim 1, characterized in that an open end of the first bearing gap (20) is sealed by a capillary sealing gap (22) that is defined by a surface of the first bearing cone (14) and an adjoining surface of a cover cap (18) connected to the first bearing bush (16).

6. A fluid dynamic bearing system according to claim 1, characterized in that an open end of the first bearing gap (20) is sealed by a capillary sealing gap (24) that is defined by a surface of the shaft (12) and an adjoining surface of the first bearing bush (16).

7. A fluid dynamic bearing system according to claim 1, characterized in that an open end of the second bearing gap (32) is sealed by a capillary sealing gap (34) that is defined by a surface of the second bearing cone (26) and an adjoining surface of a cover cap (30) connected to the second bearing bush (28).

8. A fluid dynamic bearing system according to claim 1, characterized in that an open end of the second bearing gap (32) is sealed by a capillary sealing gap (34) that is defined by a surface of the shaft (12) and an adjoining surface of the second bearing bush (28).

9. A fluid dynamic bearing system according to claim 1, characterized in that the angles $\alpha$ and $\beta$ constitute are between 25° and 45°.

10. A spindle motor having a stator, a rotor, an electromagnetic drive system and a fluid dynamic bearing according to the characteristics of claim 1 for the rotatable support of the rotor with respect to the stator.

11. A disk drive having a spindle motor according to claim 10, at least one storage disk driven by the spindle motor and means of for reading and/or writing data from and on the storage disk.

* * * * *